United States Patent
Hey et al.

(10) Patent No.: US 9,594,550 B2
(45) Date of Patent: *Mar. 14, 2017

(54) AUTOMATED PATCH GENERATION

(71) Applicant: International Business Machines Corporation, Armonk, NY (US)

(72) Inventors: Laurence A. Hey, Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,866

(22) Filed: Mar. 6, 2014

(65) Prior Publication Data

US 2014/0281665 A1    Sep. 18, 2014

Related U.S. Application Data

(63) Continuation of application No. 13/833,622, filed on Mar. 15, 2013.

(51) Int. Cl.
*G06F 9/44* (2006.01)
*G06F 9/445* (2006.01)
*G06F 11/36* (2006.01)

(52) U.S. Cl.
CPC ............ *G06F 8/65* (2013.01); *G06F 8/60* (2013.01); *G06F 8/71* (2013.01); *G06F 11/36* (2013.01)

(58) Field of Classification Search
None
See application file for complete search history.

(56) References Cited

U.S. PATENT DOCUMENTS 6,317,880 B1 * 11/2001 Chamberlain ............ G06F 8/65
                                                      707/999.202
6,763,517 B2    7/2004 Hines
7,127,712 B1 * 10/2006 Noble ....................... G06F 8/65
                                                      717/168

(Continued)

OTHER PUBLICATIONS

IBM Corporation, "Automated Software Patch Generation," IPCOM000167914D, Feb. 22, 2008, pp. 1-2.

*Primary Examiner* — Evral E Bodden
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for generating software patches. In an implementation, a method may include receiving an indication of a software product and a product level of the software product. An indication of a specific defect associated with the software product and the product level may be received. A defect change-set associated with a correction of the specific defect may be identified. An overlapping change-set may be determined based on, at least in part, a source control history associated with the software product. The overlapping change set may occur between the product level and the defect change-set in the source control history and may implicate at least one common file with the defect change-set. A software patch correcting the specific defect may be generated based on the defect change-set and the overlapping change-set.

11 Claims, 4 Drawing Sheets

(56) References Cited

U.S. PATENT DOCUMENTS

| | | | |
|---|---|---|---|
| 8,028,271 B2* | 9/2011 | deVries | G06F 8/68 |
| | | | 717/110 |
| 8,065,672 B2 | 11/2011 | Sriram et al. | |
| 8,615,752 B2* | 12/2013 | Izard et al. | 717/169 |
| 8,677,348 B1 | 3/2014 | Ramanathpura et al. | |
| 8,775,392 B1* | 7/2014 | Walker | G06F 17/30144 |
| | | | 707/695 |
| 9,063,819 B2* | 6/2015 | Raju | G06F 9/45504 |
| 2005/0049998 A1* | 3/2005 | Ruhlow et al. | 707/1 |
| 2007/0106979 A1* | 5/2007 | Felts | 717/124 |
| 2007/0260647 A1* | 11/2007 | Jaffri | H04L 67/06 |
| 2008/0178168 A1 | 7/2008 | Sriram et al. | |
| 2009/0144716 A1 | 6/2009 | Felts | |
| 2009/0144827 A1* | 6/2009 | Peinado et al. | 726/25 |
| 2012/0023147 A1 | 1/2012 | Kim et al. | |
| 2014/0281665 A1* | 9/2014 | Hey | G06F 8/65 |
| | | | 714/3 |

\* cited by examiner

AUTOMATED PATCH GENERATION

RELATED APPLICATIONS

The subject application is a continuation application of U.S. patent application Ser. No. 13/833,622, filed on Mar. 15, 2013, the entire content of which is herein incorporated by reference.

TECHNICAL FIELD

The present disclosure generally relates to systems and method for software patches.

BACKGROUND

Despite the best efforts of software developers, the size and complexity of many software products may often result in various issues, such as defects or problems, with the software product. The various issues with the software product may be uncovered during internal testing before the software product is provided to customers, or may be discovered by customers after the software product has been delivered. As issues with the software are found appropriate corrective measures may be taken. In some situations, the issues may be corrected in a subsequent release of the software product, for example, in a future version of the software product. In other instances, at least some of the issues may be corrected through software patches, which may be created to correct the problem prior to the next formal version release of the software product.

SUMMARY OF DISCLOSURE

According to an implementation, a computer-implemented method may include receiving an indication of a software product and a product level of the software product, and receiving an indication of a specific defect associated with the software product and the product level. The method may also include identifying a defect change-set associated with a correction of the specific defect. The method may also include determining an overlapping change-set based on, at least in part, a source control history associated with the software product. The overlapping change set may occur between the product level and the defect change-set in the source control history and may implicate at least one common file with the defect change-set. The method may further include generating a software patch correcting the specific defect based on the defect change-set and the overlapping change-set.

One or more of the following features may be included. The overlapping change set may include a prerequisite software patch, and the software patch may include the prerequisite software patch and a patch based on the defect change-set. The method may include mapping a source code change associated with one or more of the defect change-set and the overlapping change-set to one or more built file based on, at least in part, the source control history and a build process associated with the software product. The method may further include retrieving the one or more built files from a build output repository. Retrieving the one or more built files may include extracting at least one of the one or more built files from a compressed archive within the build output repository. The method may further include, determining that at least one of the one or more built files cannot be directly applied to a deployment of the software product. The method may also include merging the at least one of the one or more built files into a container associated with the deployment of the software product. Generating the software patch may also include aggregating the one or more built files into a payload file structure. Generating the software patch may also include packaging the payload file structure into an installable software patch. Generating the software patch may further include publishing the installable software patch.

According to another implementation, a computer program product includes a computer readable medium having a plurality of instructions stored on it. When executed by a processor, the instructions may cause the processor to perform operations including receiving an indication of a software product and a product level of the software product. Instructions may also be included for receiving an indication of a specific defect associated with the software product and the product level. Instructions may also be included for identifying a defect change-set associated with a correction of the specific defect. Instructions may also be included for determining an overlapping change-set based on, at least in part, a source control history associated with the software product. The overlapping change set may occur between the product level and the defect change-set in the source control history and may implicate at least one common file with the defect change-set. Instructions may further be included for generating a software patch correcting the specific defect based on the defect change-set and the overlapping change-set.

One or more of the following features may be included. The overlapping change set may include a prerequisite software patch, and the software patch may include the prerequisite software patch and a patch based on the defect change-set. Instructions may be included for mapping a source code change associated with one or more of the defect change-set and the overlapping change-set to one or more built file based on, at least in part, the source control history and a build process associated with the software product. Instructions may also be included for retrieving the one or more built files from a build output repository. The instructions for retrieving the one or more built files may include instructions for extracting at least one of the one or more built files from a compressed archive within the build output repository. Instructions may also be included for determining that at least one of the one or more built files cannot be directly applied to a deployment of the software product. Instructions may also be included for merging the at least one of the one or more built files into a container associated with the deployment of the software product. The instructions for generating the software patch may also include instructions for aggregating the one or more built files into a payload file structure. The instructions for generating the software patch may also include instructions for packaging the payload file structure into an installable software patch. The instructions for generating the software patch may also include instructions for publishing the installable software patch.

According to another implementation, a computer-implemented method may include receiving an indication of a software product and a product level of the software product, and receiving an indication of a specific defect associated with the software product and the product level. The method may also include identifying a defect change-set associated with a correction of the specific defect. The method may also include mapping a source code change associated with the defect change-set to one or more built files based on, at least in part, a source control history and a build process associated with the software product. The method may further include generating a software patch correcting the specific defect including, at least in part, the one or more built files.

One or more of the following features may be included. The method may further include determining an overlapping change-set based on, at least in part, the source control history associated with the software product. The overlapping change set may occur between the product level and the defect change-set in the source control history and may implicate at least one common file with the defect change-set. Mapping the source code change may include mapping a source code change associated with the overlapping change-set to one or more built files corresponding to the overlapping change-set. The method may also include retrieving the one or more built files from a build output repository. Retrieving the one or more built files may include extracting at least one of the one or more built files from a compressed archive within the build output repository. The method may also include determining that at least one of the one or more built files cannot be directly applied to a deployment of the software product. The at least one of the one or more built files may be merged into a container associated with the deployment of the software product. Generating the software patch may include aggregating the one or more built files into a payload file structure. Generating the software patch may also include packaging the payload file structure into an installable software patch. Generating the software patch may further include publishing the installable software patch.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Defects in a software product may be detected and require correction in between standard or planned revision releases through the use of targeted patches that may be directed at correcting specific defects. In some instances, it may be desirable to keep the software patches as small or limited in scope as possible while still correcting specific defect. For example, a software patch for a specific defect may only include the binaries and resources necessary to correct the specific defect at issue. In some instances, the software product may have undergone one or more changes since the release version of the software product for which the patch is being created. The changes to the software product may effect the same one or more of the binaries or resources as the defect. As such, it may be necessary to include the changes in the software patch. Similarly, any binaries or resources implicated in the changes (which are effected by the defect) may also need to be included in the software patch. In some embodiments consistent with the present disclosure, overlapping change-sets from previous changes to the source code that are implicated in the patch may be automatically identified using a source code control history. In some embodiments, change sets identified from a source code control history may be mapped to built binary files and resources files. The mapped built binary files and resource files may be utilized in connection with generating software patches.

Figure 1:
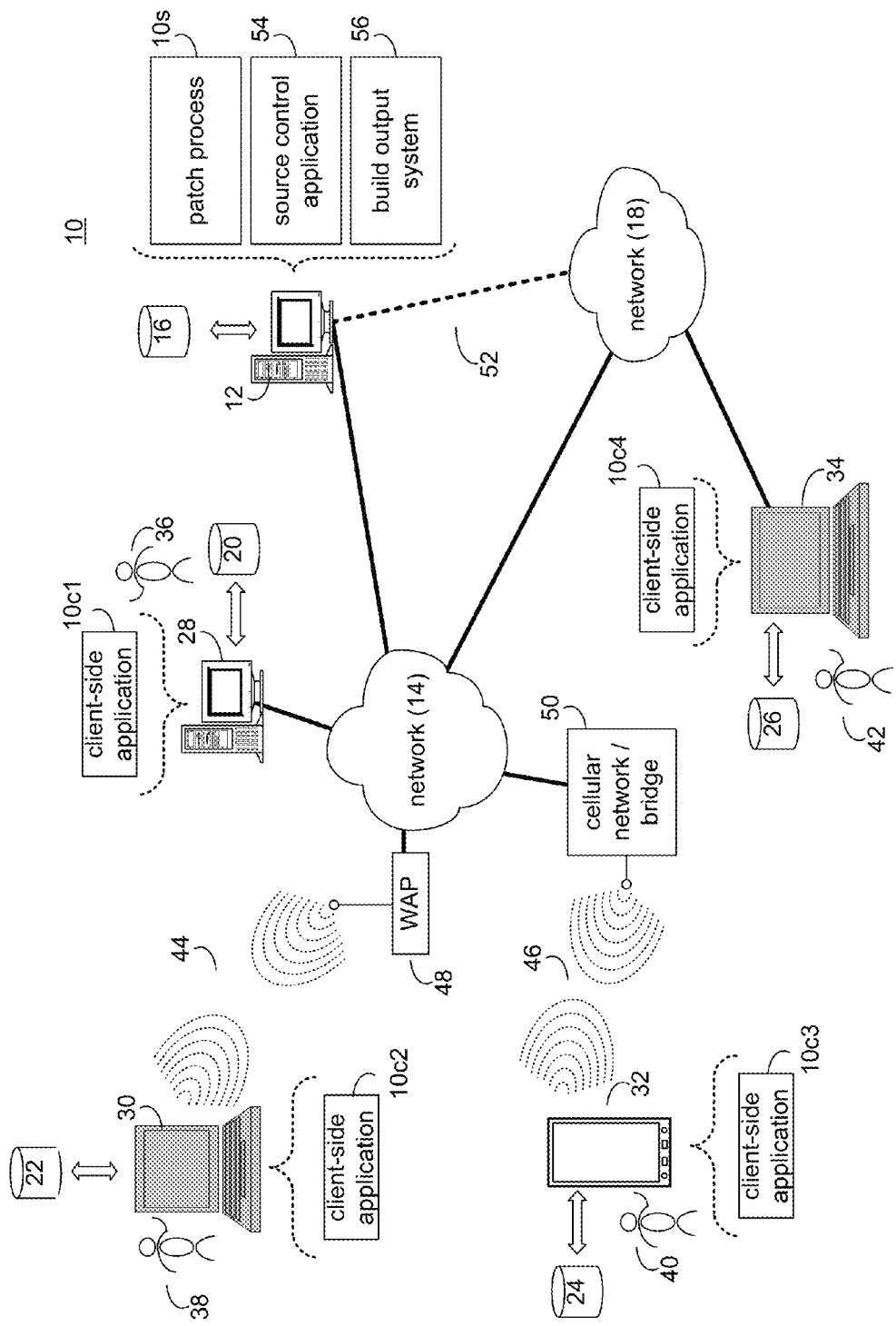
FIG. 1 is a diagrammatic view of a distributed computing network including a computing device that executes a patch process according to an implementation of the present disclosure.

Referring to FIG. 1, there is shown patch process 10. For the following discussion, it is intended to be understood that patch process 10 may be implemented in a variety of ways. For example, patch process 10 may be implemented as a server-side process, a client-side process, or a server-side/client-side process.

For example, patch process 10 may be implemented as a purely server-side process via patch process 10s. Alternatively, patch process 10 may be implemented as a purely client-side process via one or more of client-side application 10c1, client-side application 10c2, client-side application 10c3, and client-side application 10c4. Alternatively still, patch process 10 may be implemented as a server-side/client-side process via screen patch process 10s in combination with one or more of client-side application 10c1, client-side application 10c2, client-side application 10c3, and client-side application 10c4. In such an example, at least a portion of the functionality of patch process 10 may be performed by patch process 10s and at least a portion of the functionality of patch process 10 may be performed by one or more of client-side application 10c1, 10c2, 10c3, and 10c3.

Accordingly, patch process 10 as used in this disclosure may include any combination of patch process 10s, client-side application 10c1, client-side application 10c2, client-side application 10c3, and client-side application 10c4.

Figure 2:
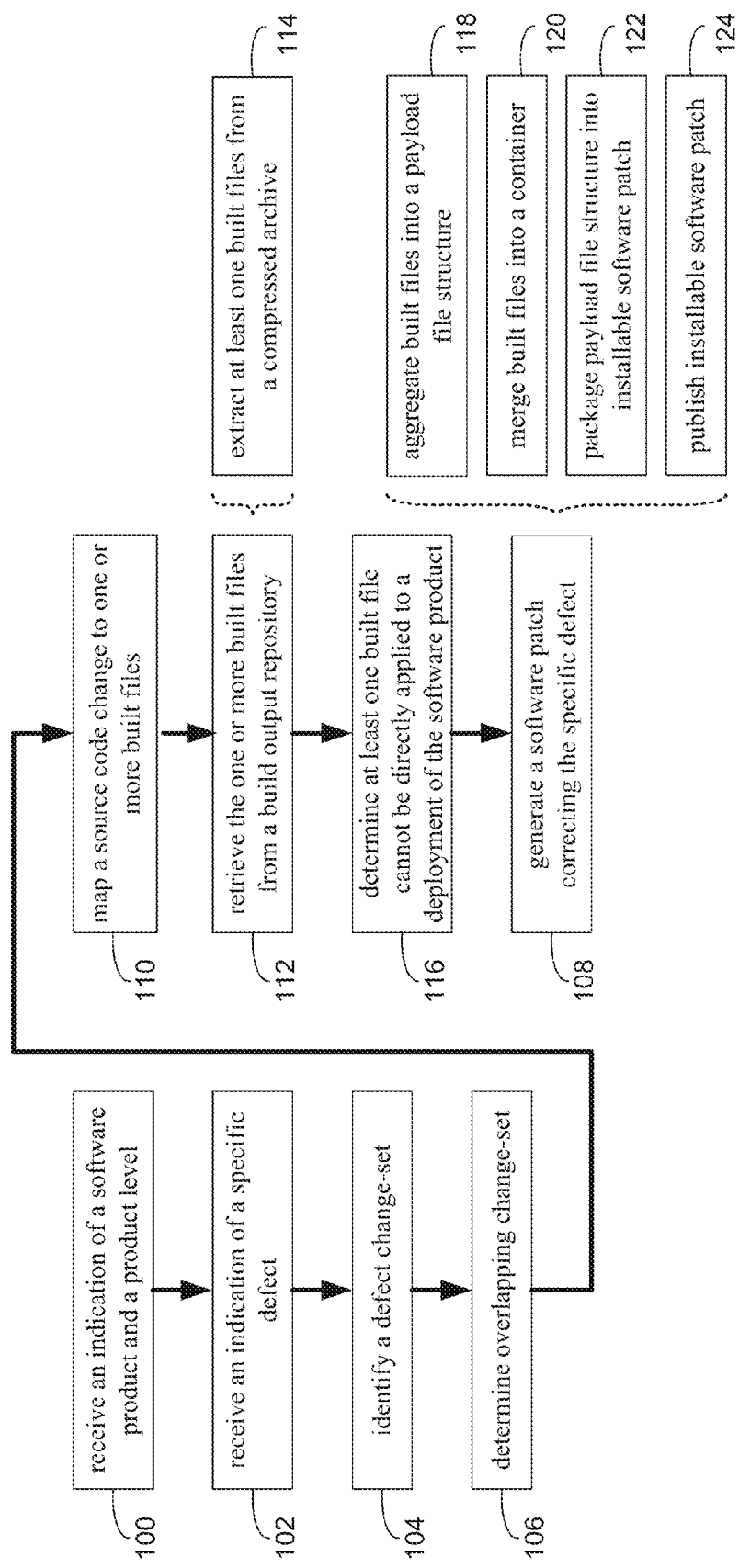
FIG. 2 is a flowchart of the patch process of FIG. 1, according to an implementation of the present disclosure.

Referring also to FIG. 2, and as will be discussed in greater detail below, patch process 10 may receive 100 an indication of a software product and a product level of the software product. Patch process 10 may also receive 102 an indication of a specific defect associated with the software product and the product level. Patch process 10 may also identify 104 a defect change-set associated with a correction of the specific defect. Patch process 10 may also determine 106 an overlapping change-set based on, at least in part, a source control history associated with the software product. The overlapping change set may occur between the product level and the defect change-set in the source control history and may implicate at least one common file with the defect change-set. Patch process 10 may further generate 108 a software patch correcting the specific defect based on the defect change-set and the overlapping change-set.

Patch process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of patch process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive;

a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access patch process 10 directly through network 14 or through secondary network 18. Further, screen capture process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, patch process 10 may communicate with, interact with, and/or include a component or module of a source control or software version control application (e.g., source control application 54). As is generally know, a source control application (e.g., source control application 54) may generally manage and track changes to software source code. Various changes made to the software source code may be identified and tracked, such that each revision or change to the software source code may be identified. As such, source control application 54 may document and identify changes, or revisions, that are made to the source code of one or more software products, when the changes were made, the nature or impact of such changes, the source code that was changed, as well as various other information. As such, changes to the software (e.g., to the software source code) that take place over time may be documented using source control application 54. Various information in addition to source code changes or revisions may also be documented or tracked by, or using, source control application 54. In an embodiment, the data associated with, generated by, and/or collected by source control application may be stored, e.g., on storage device 16 associated with server computer 12, which executes source control application, and/or another suitable storage device.

In an embodiment, patch process 10 may communicate with, interact with and/or include a component or module of a build output system (e.g., build output system 56). Build output system 56 may generally manage one or more built versions of one or more software products. For example, source code associated with a software product, a version of a software product, and/or a portion of a software product may be compiled to produce executable or machine useable software code. Compiled source code may include a "build" of the software embodied by the source code. The build may include one or more built files (e.g., binary files, resource files, etc.). In an embodiment, build output system may maintain a build output repository including one or more built files that may, for example, be stored on storage device 16 associated with server computer 12, which executes build output system 56, and/or another suitable storage device. The build output repository may include built files corresponding to one or more versions of a software product, and/or corresponding to one or more revisions of a software product.

Various software products may have different release cycles, which may include, for example, major releases and minor releases. When a defect is identified, for example, by a development engineer or a customer or user of the software, a patch may be created to remedy the defect. In situations in which different customers may utilize different versions of the software product, and for example when the defect may be identified in between release cycles of the software product, it may be desirable to create an isolated, or targeted, patch that may be directed at only remedying the specifically identified defect. In some situations, for various business or technical reasons, the isolated or targeted patch may be determined to be a preferable solution to, for example, a cumulative patch that might include fixes or remedies for all issues associated with a specific product level or release.

A software developer may debug a particular defect in a software product, such as a defect that may be identified by a customer or user of the software product. The changes to the source code made in order to debug the defect may be checked into a source, or version, control system. The source control system may track the changes to the source code associated with fixing the particular defect. Through the course of ongoing product development and/or defect correction, various different changes to the source code of a software product may be made and checked into the source control system in between releases of the software product. In some situations, each time a change to the source code is made, the software product may be built. That is, each time a change to the source code is made the source code may be compiled to provide the actual computer executable and/or machine useable software product.

In some embodiments, it may be desired to generate a patch to be released to one or more customers or users of a software product that may address a specific defect or issue with the software product. In an embodiment, a patch generation system may allow for the generation of patch files using source control history and build output to allow patches to be created to remedy specific defects. In an embodiment, a patch generation system may automatically determine any change-sets that may overlap with a defect change-set, which is created to remedy the specific defect, based on source control history for the software product. An overlapping change-set may generally include any other changes to the source code since the release for which the defect change-set is created, that may touch, or implicate, one or more files or resources that are implicated by the defect change set. That is, previous changes to the source code may have been made that effected files or resources that are utilized by the source code changes to remedy the specific defect. Such changes may be incorporated into the patch for the specific defect, e.g., to ensure that the patch for the specific defect will perform properly. In an embodiment, change-sets from a source control history for a software product may be mapped to built binary files and/or resource files for generating patch files. For example, as described above, in some situations the software product may be built every time changes are made to the source code. The built files corresponding to change-sets identified in the source control history may be mapped to the corresponding change-sets in the source control history.

As generally discussed above with reference to FIG. 2, patch process 10 may receive 100 an indication of a software product and a product level of the software product. Patch process 10 may also receive 102 an indication of a specific defect associated with the software product and the product level. Patch process 10 may also identify 104 a defect change-set associated with a correction of the specific defect. Patch process 10 may also determine 106 an overlapping change-set based on, at least in part, a source control history associated with the software product. The overlapping change set may occur between the product level and the defect change-set in the source control history and may implicate at least one common file with the defect change-set. Patch process 10 may further generate 108 a software patch correcting the specific defect based on the defect change-set and the overlapping change-set.

Figure 3:
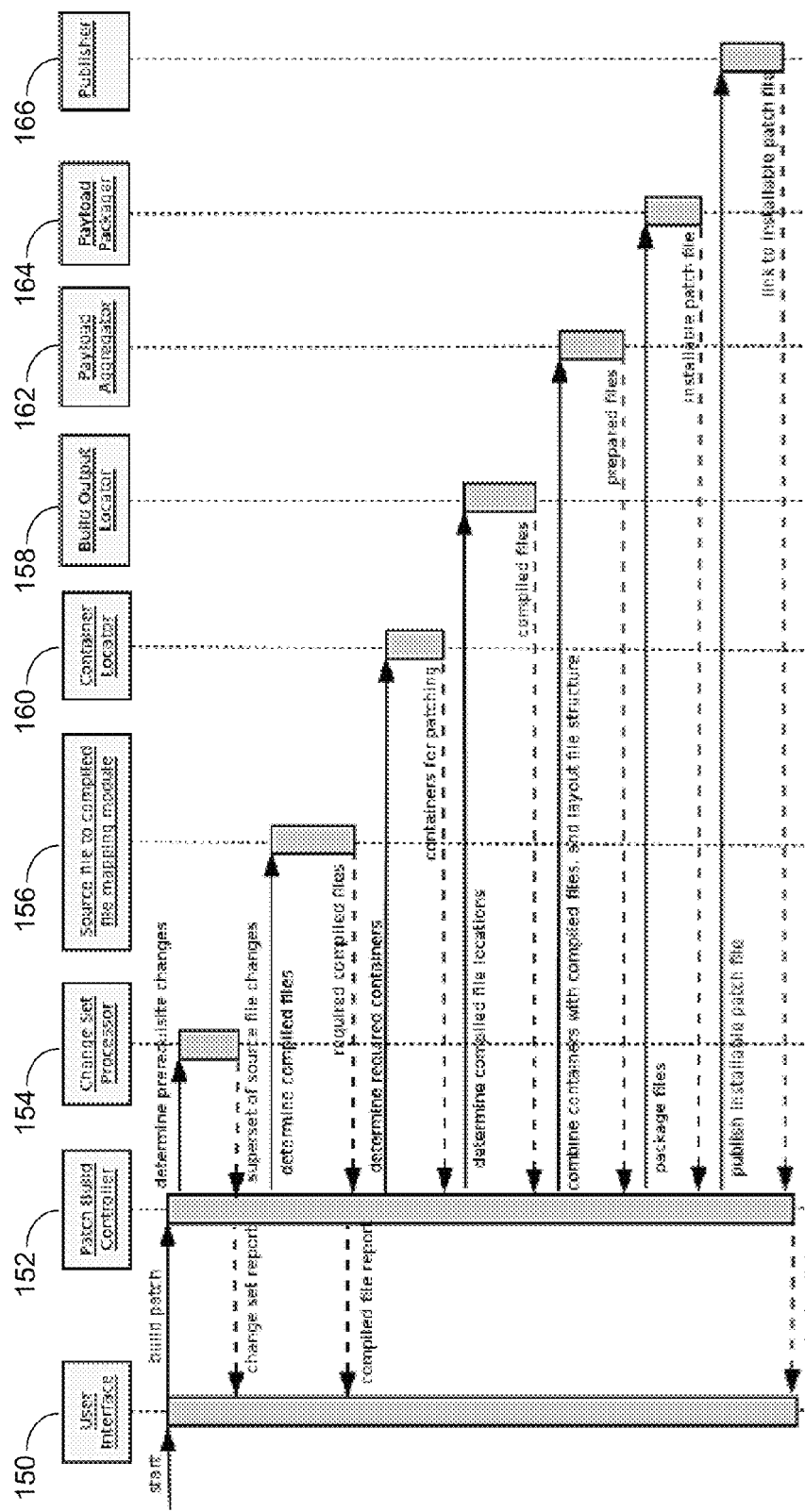
FIG. 3 is diagrammatic representation of an example patch process of FIG. 1, according to an implementation of the present disclosure.

For example, and with additional reference to FIG. 3, patch process 10 may receive 100 an indication of a software product and a product level of the software product. Patch process 10 may also receive 102 an indication of a specific defect associated with the software product and the product level. For example, patch process 10, and/or another process or application, may provide a user interface through which a user (e.g., user 36 operating desktop computer 28) may select a software product for which a patch is desired, and the product level (e.g., the version or release for which the patch is desired). In an embodiment, patch process 10, or another process or application, may operate a java servlet (e.g., via server patch process 10s) may provide a web interface (e.g., which may include one or more HTML and/or Javascript pages) that may be utilized by user 36 (e.g., via a web browser). In an embodiment, the java servlet may provide a number of code modules that may interact with one or more external systems (such as source control application 54, build output system 56, an ftp server, etc.). In an embodiment, patch process 10 may be a stand-alone application, e.g., which may be executed on a desktop computer, such as client-side application 10c1 executed on desktop computer 28, and which may similarly provide a number of code modules that may interact with one or more external systems.

By way of the user interface (e.g., user interface 150 shown in FIG. 3), user 36 may input the software product for which the patch is desired. Similarly, user 36 may input the product level (i.e., the product release or version) for which the patch is desired. In an embodiment, the user may select one or more of the software product and the product level from a menu or list, and/or may directly input the software product and the product level. Patch process 10 may receive 100 the indication of the software product and the product level in response to the selections and/or inputs by the user via user interface 150. The software product and product level may form the basis or reference point from which a patch may be generated.

In response to receiving 100 the indication of the software product and the product level, patch process 10 may present the user (via a list, menu, or the like) with one or more options to select or input a defect for which a patch is to be generated and/or a defect change-set (e.g., the source code change-set for remedying the specific defect) for which the patch is to be generated. In an embodiment, patch process 10 may access a source control system (e.g., source control application 54) to identify defects and/or change-sets included within the source control system, which may indicate a defect for which patches may be generated. In response to user 36 selecting an identified specific defect and/or a change-set associated with a specific defect (e.g., a defect change-set), patch process 10 may receive 102 the indication of the specific defect for which the patch is desired. In an embodiment, in response to receiving 100, 102 the indication of the software product, the product level, and the specific defect to be patched, user interface 150 may send a request to patch build controller 152 to build a patch for the software product, product level, and specific defect.

Patch process 10 may also identify 104 a defect change-set associated with a correction of the specific defect. For example, patch build controller 152 may pass the request to build a patch for the software product, product level, and specific defect to change set processor 154. Change set processor 154 may read a source control history (e.g., including sending a request to source control application 54 for the source control history associated with the software product, the product level, and the specific defect) to identify changed source files associated with the specific defect (e.g., the defect change-set) and the product level. The defect change-set may include the changes to the source code that were made to remedy the specific defect for the indicated product level of the indicated software product.

In an embodiment, one or more files or resources implicated in the defect change-set may have been changed relative to the product level of the software product for which the patch is desired. In an embodiment, patch process 10 may also determine 106 an overlapping change-set based on, at least in part, a source control history associated with the software product. For example, the defect change-set may touch, or implicate, one or more files or resources, which may be changed in order to remedy the specific defect. However, one or more of the files or resources that were changed in order to remedy the specific defect may have been touched, or implicated, in one or more overlapping change sets that occurred between the product level and the defect change-set in the source control history. That is, the overlapping change-sets may have been created in the time period between the release of the product level and the creation of the defect change-set. Further, one or more of the files or resources that were changed by the defect change-set to remedy the specific defect may have already been changed (relative to the product level for which the patch is desired). Accordingly, the intervening changes to the files or resources by the overlapping change-sets since the release of the product level must be accounted for in generating the patch. The one or more overlapping change-sets may, for example, be the result of other changes or defect fixes to the product level that were made prior to the defect change-set.

In an embodiment, the overlapping change set may include a prerequisite software patch. As such, the software patch generated 108 to remedy the specific defect may include the prerequisite software patch, as well as a patch based on the defect change-set. In an embodiment, the overlapping change set may simply include one or more additional files and/or resources that may be changed as part of the patch to remedy the specific defect. In an embodiment, the defect change-set and the one or more overlapping change-sets may define a superset of source file changes. In an embodiment, change set processor 154 may report the superset of source files changes to patch build controller 152. In an embodiment, patch build controller 152 may generate a change-set report that may be transmitted to user interface 150. User 36 may ascertain the necessary source code changes for remedying the specific defect based on the change-set report provided by patch build controller 152.

Patch process 10 may map 110 a source code change associated with one or more of the defect change-set and the overlapping change-set to one or more built file based on, at least in part, the source control history and a build process associated with the software product. The one or more built files may include one or more binary files or resource files generated when the source code for the defect change-set and/or the one or more overlapping change-sets are compiled. For example, patch build controller 152 may transmit a request to determine compiled files to source file to compiled file mapping module 156. Source file to compiled file mapping module 156 may map changed source files (e.g., from the defect change-set and/or the one or more overlapping change-sets) from the source control history to built binary files and resources that resulted from builds of the software product associated with each change-set. In an embodiment, source file to compiled file mapping module 156 may be build process aware (i.e., may have knowledge of the build process). Accordingly, changes to source files may (e.g., based on the source control history accessed from source control application 54) may be mapped to built binaries and resources at each build of the software product associated with each change-set.

For example, as generally described above—after each change-set the software product may get built. The output of each build may be stored in a build output repository (e.g., which may be managed by build output system 56). At each build, source file to compiled file mapping module 156 may map the changed source files to the location of the output that they produce. Source file to compiled file mapping module 156 may read build files (such as ANT build xml files) for specific instruction, and may combine the instructions with in-built knowledge of the build technology (e.g., ANT, Maven, Java, OS, etc.) and conventions used in the build. Source file to compiled file mapping module 156 may return a list of the required compiled files for the patch to patch build controller 152. In an embodiment, patch build controller 152 may provide a compiled file report to user interface 150, e.g., for display of a list of the required compiled files for user 36.

Patch process 10 may retrieve 112 the one or more built files from a build output repository. For example, based on the determined compiled file locations for the built files associated with the defect change-set and/or the one or more overlapping change-sets mapped 110 to the source code changes, build output locator 158 may retrieve the identified binary files and resource files from the build output repository (e.g., which may be managed by build output system 56). In an embodiment, build output locator 158 may locate (e.g., based on mapping 110) the particular built files (e.g., binaries and/or built resource files) that need to be changed in the product level via the patch in the build output repository and may retrieve the particular built files from the build output repository. In an embodiment, build output locator 158 may retrieve the particular built files using file transfer protocol, or another suitable network protocol.

In an embodiment, retrieving 112 the one or more built files may include extracting 114 at least one of the one or more built files from a compressed archive within the build output repository. For example, in some embodiments, patch process 10 determine 116 that at least one of the one or more built files cannot be directly applied to a deployment of the software product. In some situations, one or more of the files to be changed via the patch may be included within a container. In an embodiment, some of the files may need to be merged into one or more containers matching the product level to be patched. For example, in the deployed product the at least one of the one or more built files may be contained within an container file (e.g., a compressed file, a zip file, a JAR file, etc.). In such a situation, container locator 160 may determine the required containers, i.e., the containers including the one or more built files in the product level associated with the patch to be generated.

In an embodiment, one or more of container locator 160, source file to compiled file mapping module 156, and/or build output locator 158 may identify which files may require containers based on knowledge of the software product architecture. For example, based on, at least in part, the build process, the product level, and the customer deployment of the software product, patch process 10 may determine which built files needed for the patch (e.g., a built file corresponding to the defect change-set and/or one or more overlapping change-sets) may be included within a container (e.g., which may be stored in the build output repository). Container locator 160 may determine (e.g., based on knowledge of the build process and/or deployment of the product level) which container, or containers, may include the built file needed for the patch. Further, in an embodiment, container locator 160 may also determine where the containers may reside, e.g., within the build output repository.

Once patch process 10 has identified one or more required files as being included within a container and where the container is located within the build output repository, patch process 10 may retrieve 112 the built file including extracting 114 at least one of the one or more built files from a compressed archive within the build output repository. Extracting 114 the one or more built files from a compressed archive may include, for example, unzipping the compressed archive and extracting the one or more built files from the unzipped archive. As such, patch process 10 may be capable of extracting 114 one or more individual files from within a compressed archive of the product build output repository. In an embodiment, retrieving 112 the one or more built files by extracting 114 the files from a compressed archive may include retrieving 112 the one or more files via a suitable network protocol (e.g. file transfer protocol, etc.)

Consistent with the foregoing, patch process 10 may (e.g., via one or more of source file to compiled file mapping module 156, build output locator 158, and/or container locator 160) locate the built files corresponding to the defect change-set and one or more overlapping change-sets (e.g., which may include the files needed for the patch to remedy the specific defect), and may retrieve 112 the built files.

Having retrieved 112 the built files, patch process 10 may generate 108 a software patch correcting the specific defect based on the defect change-set and the overlapping change-set. Generating 108 the software patch may include aggregating 118 the one or more built files into a payload file structure that may be suitable for packaging as a software patch.

For example, payload aggregator 162 may aggregate the located containers and built files into an appropriate payload file structure that may be suitable for packaging as a software patch. Further, in response to determining 116 that at least one of the one or more built files cannot be directly applied to a deployment of the software product, payload aggregator 162 may merge 120 the at least one or the one or more built files into a container associated with the deployment of the software product. That is, for example, the one or more files that cannot be directly applied to the deployment of the software product may be merged into one or more compressed archives, e.g., which may be applied to the deployed software product. In an embodiment, merging 120 the one or more built files into a container associated with the deployment of the software product may include obtaining the original corresponding container of the product level, unzipping (e.g., uncompressing) the container, and replacing the original file of the product level with the built file corresponding to the defect change-set and/or the overlapping change-set. In some instances, merging 120 a built file into a container may include adding a new file to the container. The container may then be re-zipped, or compressed to provide a deployable container that may be applied to the deployed software product. For example, payload aggregator may merge 120 individual Java class files into appropriate JAR's (e.g., based on the structure of the deployed product level of the software product for which the patch is being generated 108), and the JAR's may be merged into appropriate WAR's, etc. (based on the structure of the deployed product level of the software product for which the patch is being generated 108). It will be appreciated that the payload file structure may be dependent upon the structure of the deployed product level of the software product for which the patch is being generated, and as such may vary accordingly.

Generating 108 the software patch may also include packaging 122 the payload file structure into an installable software patch. For example, payload packager 164 may prepare the payload file structure provided by payload aggregator 162 for installation. In an embodiment, packaging 122 the payload file structure may include, for example, compressing the payload, generating a "readme" file with instructions, generating an installation script, and/or using a separate tool (e.g., a counterpart tool which may be used to install the patch). Accordingly, payload packager 164 may package 122 the payload file structure based on a format required for the patch to be installed on the deployed product level of the software product of the customer for whom the patch is being generated 108.

In an embodiment, generating 108 the software patch may further include publishing 124 the installable software patch. For example, payload packager 164 may pass the installable software patch to publisher 166. Publisher 166 may publish the installable software patch, e.g., which may include copying the packaged files to a file repository (e.g., which may reside, for example, on storage device 16 associated with server computer 12 and/or on another storage device). In an embodiment, the file repository may include an associated suitable distribution system, such as an FTP server, a network share, a web server, or the like, that may facilitate transfer of the installable software patch to the customer for whom the patch was generated 108. In an embodiment, publisher 166 may return a link to the published installable software patch. In an embodiment, the link may be passed to user interface 150, e.g., which may allow user 36 to distribute the link to the customer for whom the software patch was generated 108, which may allow the customer to retrieve and install the software patch.

For the purpose of explanation, various modules been discussed and/or illustrated. For example, the various illustrative module may include user interface 150, patch build controller 152, change-set processor 154, source file to compiled file mapping module 156, build output locator 158, container locator 160, payload aggregator 162, payload packager 164, and publisher 166. In various embodiments, one or more of the modules may include one or more discrete software modules, computing modules (e.g., which may include one or more processors executing software instructions), or the like capable of performing the described functionality. In some embodiments, one or more of the modules may include logical modules including software instructions capable of performing the described functionality. In some embodiments, the various modules may be distributed so that some of the modules are deployed in the server computer and/or one or more of the client electronic devices and some modules are deployed in other client electronic devices and/or other computing devices. The functionality contained within the modules may be combined into a lesser number of modules (e.g., including a single module capable of performing all of the described functionality), further divided among a greater number of modules, or redistributed among existing modules.

Figure 4:
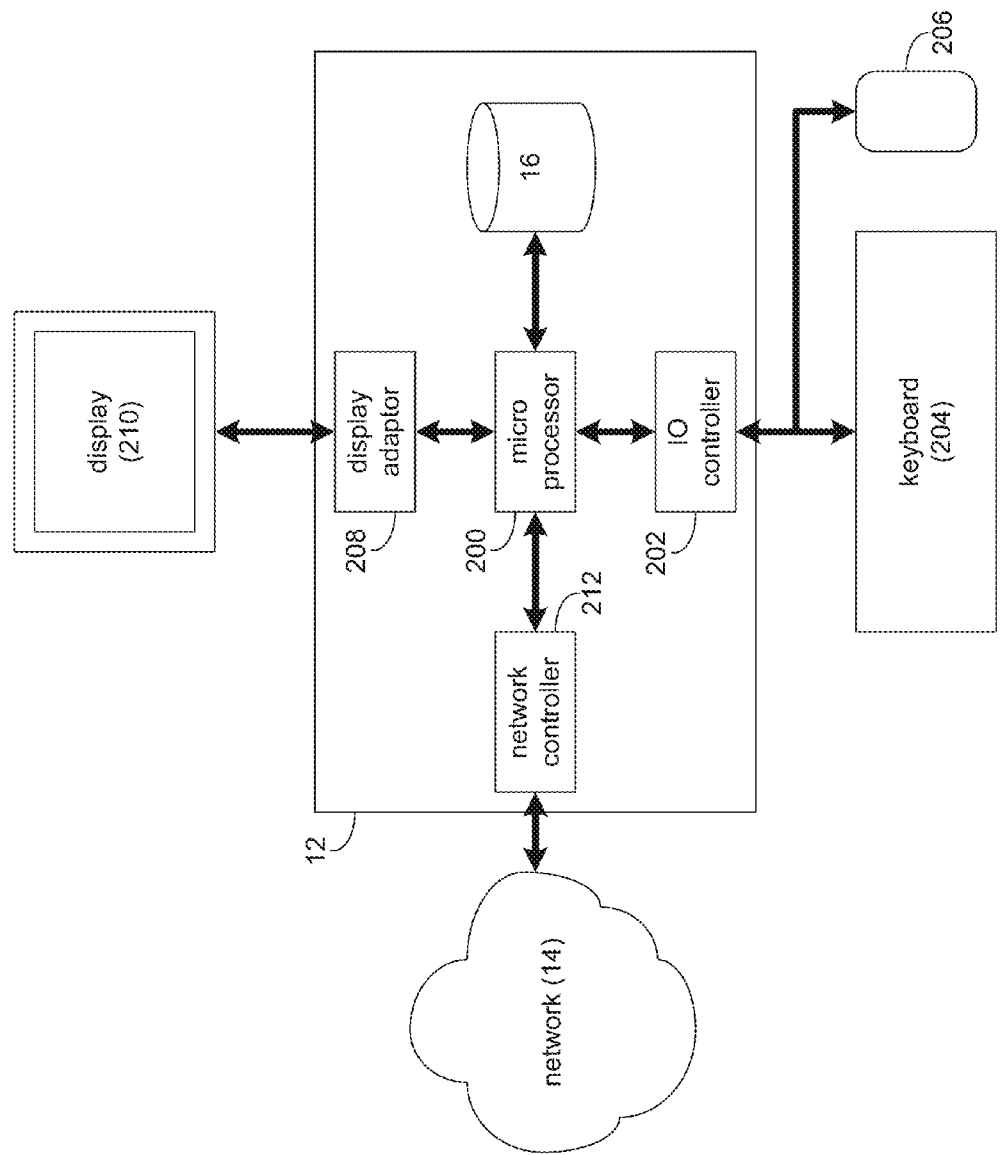
FIG. 4 is a diagrammatic view of the computing device of FIG. 1, according to an implementation of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, patch process 10 may be substituted for computing device 12 within FIG. 4, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, by a processor, an indication of a software product and a product level of the software product;
receiving, by the processor, an indication of a specific defect associated with the software product and the product level;
automatically identifying, by the processor, a defect change-set associated with a correction of the specific defect based upon, at least in part, a source control history;
automatically identifying, by the processor, a source code change to at least one common file that changed between the product level and the defect change-set, wherein the at least one common file was utilized by the defect change-set based upon, at least in part, the source control history associated with the software product;
automatically determining, by the processor, an overlapping change-set based on, at least in part, the source control history associated with the software product, the overlapping change set occurring between the product level and the defect change-set in the source control history and implicating the at least one common file with the defect change-set;
mapping a source code change associated with one or more of the defect change-set and the overlapping change-set to a location of one or more built files based on, at least in part, the source control history and a build process associated with the software product, wherein an output of each build of the software product for each defect change-set and overlapping change-set is stored in a build output repository;
returning, by the processor, a list of the required compiled files for a targeted software patch correcting the specific defect;
providing, by the processor a compiled file report to a user interface for displaying the list of required compiled files; and
generating, by the processor, the targeted software patch correcting the specific defect based on the defect change-set and the overlapping change-set including obtaining an original corresponding container of the product level, unzipping the original corresponding container, and replacing at least one original file of the product level with at least one of built file corresponding to the defect change-set and the overlapping change set.

2. The computer-implemented method of claim 1, further including:
retrieving the one or more built files from the build output repository.

3. The computer-implemented method of claim 2, wherein retrieving the one or more built files includes extracting at least one of the one or more built files from a compressed archive within the build output repository.

4. The computer-implemented method of claim 2, further including:
determining that at least one of the one or more built files cannot be directly applied to a deployment of the software product; and
merging the at least one of the one or more built files into a container associated with the deployment of the software product.

5. The computer-implemented method of claim 2, wherein generating the software patch further includes:
aggregating the one or more built files into a payload file structure;
packaging the payload file structure into an installable software patch; and
publishing the installable software patch.

6. A computer-implemented method comprising:
receiving, by a processor, an indication of a software product and a product level of the software product;
receiving, by the processor, an indication of a specific defect associated with the software product and the product level;
automatically identifying, by the processor, a defect change-set associated with a correction of the specific defect based upon, at least in part, a source control history;
automatically identifying a source code change to at least one common file that changed between the product level and the defect change-set, wherein the at least one common file was utilized by the defect change-set based upon, at least in part, the source control history associated with the software product;
mapping, by the processor, a source code change associated with one or more of the defect change-set to a location of one or more built files based on, at least in part, the source control history and a build process associated with the software product, wherein an output of each build of the software product for each defect change-set and overlapping change-set is stored in a build output repository;
returning, by the processor, a list of the required compiled files for a targeted software patch correcting the specific defect;
providing, by the processor, a compiled file report to a user interface for displaying the list of required compiled files; and
generating, by the processor, the targeted software patch correcting the specific defect including, at least in part, the one or more built files including obtaining an original corresponding container of the product level, unzipping the original corresponding container, and replacing at least one original file of the product level with at least one of built file corresponding to the defect change-set and the overlapping change set.

7. The computer-implemented method of claim 6, further comprising:
determining an overlapping change-set based on, at least in part, the source control history associated with the software product, the overlapping change set occurring between the product level and the defect change-set in the source control history and implicating the at least one common file with the defect change-set; and
wherein mapping the source code change includes mapping a source code change associated with the overlapping change-set to one or more built files corresponding to the overlapping change-set.

8. The computer-implemented method of claim 6, further including:
retrieving the one or more built files from the build output repository.

9. The computer-implemented method of claim 8, wherein retrieving the one or more built files includes extracting at least one of the one or more built files from a compressed archive within the build output repository.

10. The computer-implemented method of claim 8, further including:
- determining that at least one of the one or more built files cannot be directly applied to a deployment of the software product; and
- merging the at least one of the one or more built files into a container associated with the deployment of the software product.

11. The computer-implemented method of claim 8, wherein generating the software patch further includes:
- aggregating the one or more built files into a payload file structure;
- packaging the payload file structure into an installable software patch; and
- publishing the installable software patch.

* * * * *